United States Patent

Buysse

[11] Patent Number: 5,682,953
[45] Date of Patent: Nov. 4, 1997

[54] DEVICE FOR PICKING AND SEPARATING ROCKS

[76] Inventor: Dale Buysse, R.R. 1, Box 93, Ghent, Minn. 56239

[21] Appl. No.: 512,334

[22] Filed: Aug. 8, 1995

[51] Int. Cl.[6] .................................................. A01B 43/00
[52] U.S. Cl. ......................... 171/63; 171/97; 171/105; 171/135; 171/136; 171/144
[58] Field of Search .............................. 171/18, 63, 67, 171/68, 97, 104, 105, 106, 135, 136, 144

[56] References Cited

U.S. PATENT DOCUMENTS

| | | | |
|---|---|---|---|
| 2,484,437 | 10/1949 | Wells | 171/63 X |
| 2,636,328 | 4/1953 | Jochim | 171/144 X |
| 2,706,877 | 4/1955 | Caldwell | 171/144 X |
| 2,738,633 | 3/1956 | Bestland et al. | 171/144 X |
| 3,139,939 | 7/1964 | Vickery | 171/63 |
| 3,596,764 | 8/1971 | Lutter | 171/63 X |
| 3,627,371 | 12/1971 | Billings . | |
| 3,643,821 | 2/1972 | Viel . | |
| 3,934,917 | 1/1976 | Paxton et al. . | |
| 4,014,390 | 3/1977 | Teixeira . | |
| 4,040,489 | 8/1977 | Hulicsko | 171/63 |
| 4,059,886 | 11/1977 | Bricon . | |
| 4,113,023 | 9/1978 | Baskett | 171/63 |
| 4,296,818 | 10/1981 | Malinowski et al. | 171/144 X |
| 4,698,150 | 10/1987 | Wigoda . | |
| 4,928,410 | 5/1990 | Walters et al. . | |
| 4,959,886 | 10/1990 | Bricon . | |
| 5,027,906 | 7/1991 | Jeannotte et al. . | |
| 5,141,058 | 8/1992 | Heppner | 171/63 |
| 5,310,008 | 5/1994 | Dauvin . | |

Primary Examiner—Terry Lee Melius
Assistant Examiner—Christopher J. Novosad

[57] ABSTRACT

The present invention relates to a device that is mounted on the front of loaders or tractors for picking and separating rocks and other debris from soil admixtures. The device includes a forward dumping bucket which includes a grate at the bottom thereof for separating larger rocks/debris from smaller rocks/debris and soil. Rocks or debris are swept into the bucket by a reel which is either directly mounted on the side plates of the bucket, or is attached to a carriage which is pivotally attached to the bucket. A motor is provided which rotates the reel in a circle to sweep rocks or debris into the bucket. The reel is either rotated by the motor to a position allowing forward dumping of the contents of the bucket, or when the carriage is used, a hydraulic lift is utilized to pivot the carriage away from the bucket so as to permit forward dumping of the bucket.

18 Claims, 10 Drawing Sheets

DEVICE FOR PICKING AND SEPARATING ROCKS

1. FIELD OF THE INVENTION

This invention relates to a device for picking and separating rocks from admixtures of soil and ruble. Particularly the invention is an attachment for loaders or tractors that utilizes a bucket together with a reel and sweep member to separate rocks from other material through a grate. The invention can utilize grapple and claim action by using a hydraulically controlled carriage in addition to the bucket.

2. BACKGROUND OF THE INVENTION

Prior related art includes some devices used to separate trash from sand. These apparatuses filter sand through a grate or grid as the machine or attachment advances forward. These devices are used often to clean beaches. They are, however, not well suited to separating large rocks from other material.

Buckets of various kinds have long been used to move dirt and rocks. Clamshell or grab buckets are well known. U.S. Pat. No. 4,928,410 issued to Walters and Larson May 19, 1990 discloses a reversible clam-shell bucket that can be opened to alternately grasp or push large objects depending on the position of the arm. The device does not use a bucket, however, when used to grasp large objects such as rocks. This limits the quantity of rocks that could be picked up at one time. The device also does not use a secondary means like the reel and sweep action of the present invention to gather rocks and soil more effectively and efficiently while forwardly advancing.

U.S. Pat. No. 4,059,886 issued to Luc Bricon on Nov. 29, 1977 shows a grab bucket attachment including two scoop bowls attached to a hydraulically actuating cylinder for opening and closing the bucket. U.S. Pat. No. 3,934,917 Paxton issued Jan. 27, 1976 teaches a clamshell bucket device attached to a suspended cable. The bucket includes two bowl halves that open and close by a pulley system permitting the movement of dirt. These buckets are designed to grab large portions of dirt material at one time. While they are able to capture and move large rocks, they do not have the advantage of an adequate means of separating the rocks from the other rubble.

Other rock picking devices for attachment to implements have been made. U.S. Pat. No. 3,643,821 issued to Viel Feb. 22, 1972 discloses a hydraulically tiltable rock picker attachment that can be mounted on a suitable vehicle such as a tractor. The invention teaches a series of L-shaped forks aligned parallel to one another and attached to a pivotally mounted crossbar. U.S. Pat. No. 5,027,906 issued to Jeannotte Jul. 2, 1991 shows a rock picker attachment pivotally mounted to the side of a conventional front loader bucket. The rock picker portion includes a series of L-shaped forks hydraulically movable. The foregoing inventions are adapted to attach to other farm implements such as a bucket or stacker loader. These inventions must be forwardly moving to gather rocks. They are not designed to dig into the upper surface of the soil to root out rocks and separate them from other debris. These factors reduce the utility of the inventions.

Other rock picking devices use a conveyor system built on a frame. U.S. Pat. No. 4,113,023 issued to Baskett Sep. 12, 1978 shows a rock picker attached to a bucket. The rock picker portion includes ratable shafts having rake teeth mounted thereon and meshed together. The shafts rotate along a vertical axis moving rocks along the teeth where they are sifted and sorted. The primary limitation of this kind of rock picker relates to its ability to handle large rocks and the adequacy of the rake teeth mechanism to pick them up and advance them to the bucket.

U.S. Pat. No. 5,141,058 issued to Heppner on Aug. 25, 1992 seeks to address this problem by improving a prior rock picking device. This invention discloses a rock picker including a conveyor mounted on a frame with a member extending forward and upward to engage large rocks preventing their jamming as they progress up the conveyor. The ability of a rock picker to capture large rocks would be enhanced either by use of an independently rotating reel or allowing the large rocks to directly access the bucket without using the conveyor mechanism.

U.S. Pat. No. 5,310,008 issued to Dauvin on May 10, 1994 shows a wheel mounted rock picking grate. The grate includes a plurality of bars aligned in parallel across the grate for engaging rocks swept onto the grate and into the hopper by a reel. The reel consists of a series of bars with teeth mounted on an axle designed to ratably move the rocks and debris across the grate. The action of the reel, however, could be improved if the teeth could be extended outward and downward between grate bars used to loosen the soil surface. Overall ability of a rock picking device to gather separated rocks would be enhanced if rocks are deposited directly into the bucket without entry into an extended grating system where rocks can jam.

SUMMARY OF THE INVENTION

The present invention is a device that is mounted on loaders or tractors for picking and separating rocks from soil admixtures. Rocks are separated as the vehicle forwardly advances through a grate into a bucket. Material is swept directly into a bucket or into the bucket attached to a pivotally mounted carriage by action of a hydraulically driven reel that produces a grappling action between the bucket and carriage. Larger rocks are gathered in this embodiment independent of the reel and sweep by opening the mouth of the attachment and picking the rock by grapple or claim action.

One object of the invention is to devise a reasonably priced and affordable rock picker attachment. This attachment permits the operator to pick up rocks or objects of similar size such as plastic jugs, bricks, or cement blocks.

A further objective of this invention is to create a rock picking attachment that can be used on a variety of vehicles such as skid loaders, articulated loaders and bi-directional loaders.

Another object is to make a rock picker that can be used in fields with planted crops by designing it to accommodate and not harm rows of planted product when the apparatus is used.

A further objective of this invention is to build a rock picker that avoids using a complex system of grating and thereby avoids potential rock jamming problems.

Another object is to make a rock picker that is able to separate rocks from smaller rubble and to easily handle large rocks once they have been separated.

One object of this invention is to design a rock picking system utilizing a reel that preserves excellent vision for the operator, maintains unlimited vision of the bucket, and utilizes a safety shield to protect the operator.

Another object of this invention is to make a reel with the ability to reverse itself so as to throw off dirt from the sweep grid when digging out embedded rock.

A further object of this invention is to create a mount system that involves minimal hose connections and is adaptable to different loaders.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentality's and combinations particularly pointed out in the appended claims.

According to the present invention, the foregoing and other objects and advantages are attained by removably attaching a rock picking device to any of a variety of primary moving vehicles such as loaders or tractors. The rock picker is composed of a bucket pivotally attached to a carriage on which a reel is mounted. Rocks are separated from soil admixtures into a bucket through a grid by action of a reel and sweep member as the vehicle moves forward. Larger rocks can be gathered independent of the reel and sweep by opening the mouth of the attachment and picking the rock by grapple or claim action.

The bucket is of a size sufficient to hold rocks and should be adaptable to mounting on the primary moving vehicle. The bucket is defined by a back plate and a base plate spaced from bucket sidewalls. The base plate includes an overlying grate with elongated tubular steel bars spaced a given distance permitting the separation of dirt and debris from rocks. The strength of the bucket is reinforced by base supports or by a center support brace.

The bucket can be pivotally joined to a carriage by a mounting bracket. The carriage includes sidewalls with mounting pin openings spaced from one another. The bucket and carriage interface with one another at the sidewalls. The mounting pin openings hold a reel that pivotally rotates in a sweeping fashion.

The reel can have a horizontally positioned center shaft with mounting pins that fit in the mounting pin openings permitting the reel to rotate. The reel can also include one or more crossbars substantially perpendicular to the shaft attached to one or more brackets having teeth. Angle leg members attached to the mounting pins can be used to attach directly to the tooth bracket in lieu of the center shaft affording better visibility of the center area of the rock picker for the operator. The reel is mounted directly on the bucket in one configuration or on the carriage if grappling action structure is desired.

The carriage includes an angular upper grate portion with steel bars functioning as forks spaced from one another to separate rocks when the attachment is moved forward. The reel is rotated by a hydraulic motor secured by a bracket on the carriage sidewalls. The motor drives front and rear sprocket wheels by a chain that engages the mounting pins permitting the motor to drive the reel.

The position of the bucket relative to the carriage can be adjusted by a hydraulic means including two cylinders attached by turnbuckle to the lower outside of each bucket sidewall and the upper outside of each carriage sidewall. The position of the bucket can be expanded to a first open position to expel bucket contents or it can be contracted to a second closed position to contain bucket contents.

DETAILED DESCRIPTION OF THE PREFERRED EMBODIMENTS

The rock picking apparatus including improvements are illustrated in FIGS. 1–10 and will now be described in detail. The rock picking apparatus known as the "Kwik Pik" 1 is shown generally in FIG. 1 attached to a wheeled vehicle 5 such as a loader. The "Kwik Pik" can be removably attached to an assortment of primary moving vehicles including skid loaders, articulated loaders, and bi-directional loaders. The rock picking device is an attachment that is preferably made of a hardened or resistant steel material.

The "Kwik Pik" rock picker is designed with several of embodiments possible. The device can be constructed with the clam shell action grappling feature as shown in FIGS. 1–5. A reel 60 sweeps rocks into a bucket 20 while the vehicle forwardly advances. The grappling feature requires that the bucket 20 be in an operative relationship with a carriage 40 defining the grappling structure. The most preferred embodiment is shown in FIGS. 6–10 and includes the sweeping feature of the invention together with an enlarged bucket. This structure does not utilize the grappling feature.

Figure 2:
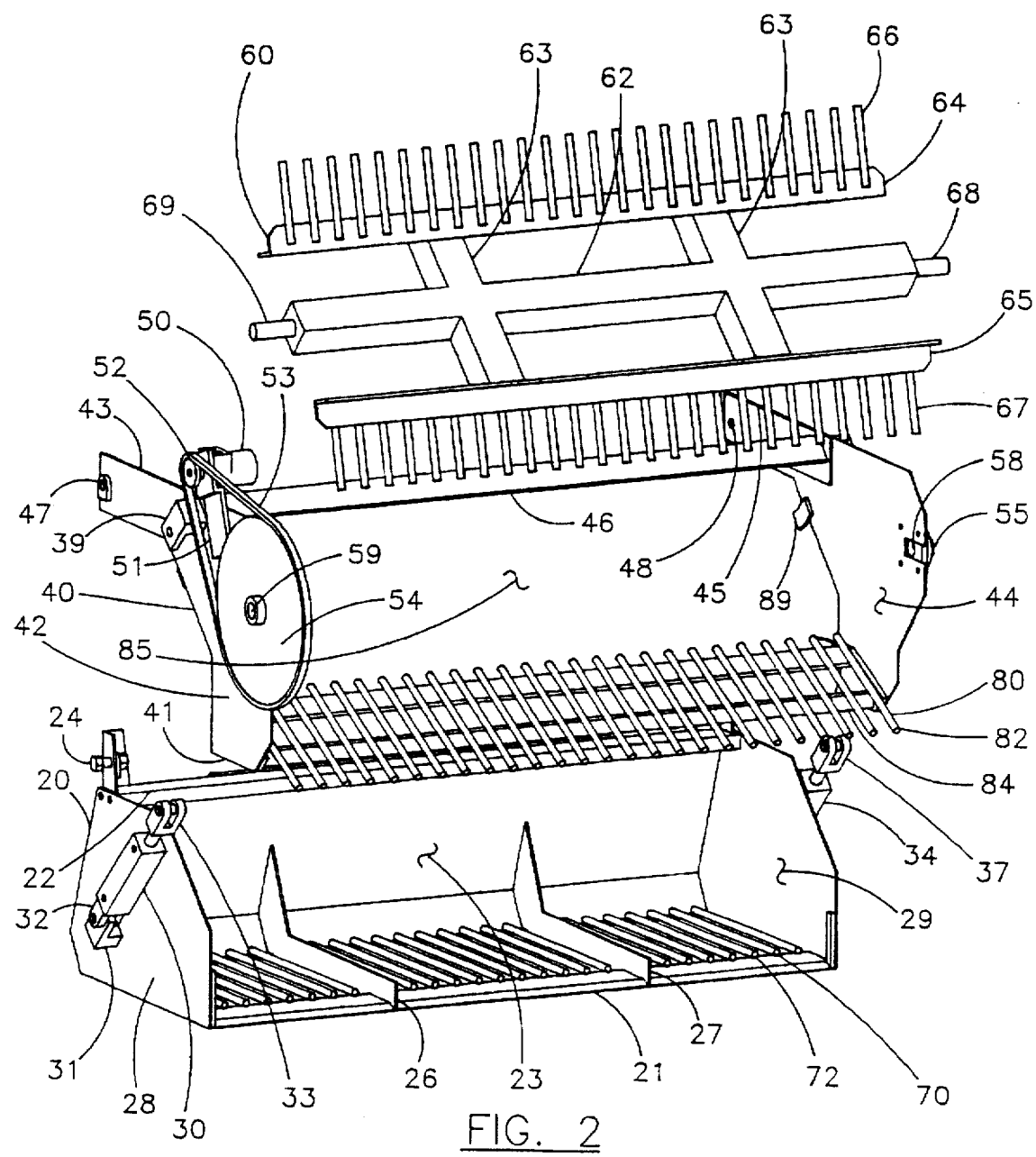
FIG. 2 is an exploded right frontal view of the rock picker showing the base bucket separated from the carriage and pivoting reel. The hydraulic motor and roller chain drive is shown attached to the carriage.
Figure 3:
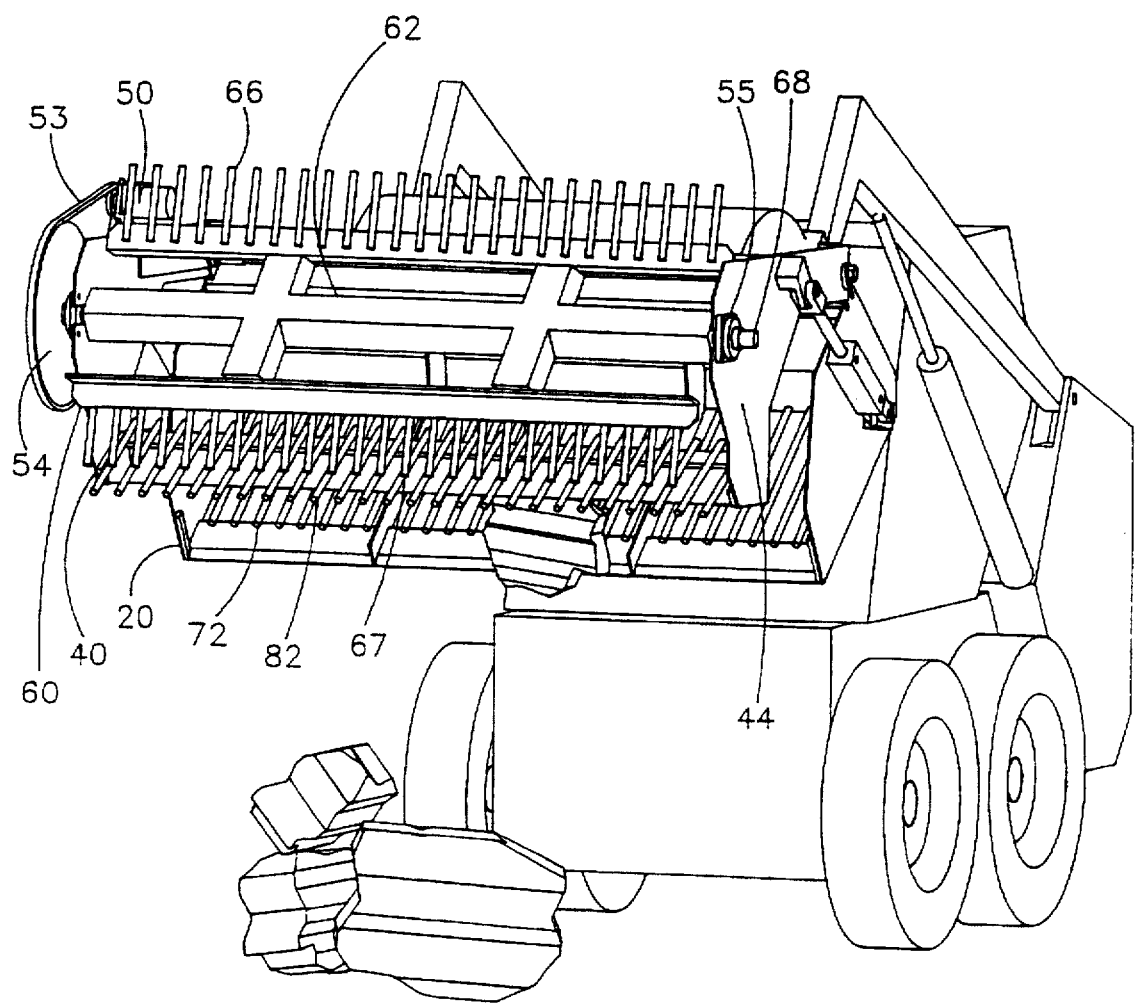
FIG. 3 is a left frontal view of the rock picker mounted on a loader in the raised position. The carriage and bucket are shown separated from one another by extension of the side cylinders permitting the device to expel rock contents from the bucket.
Figure 4:
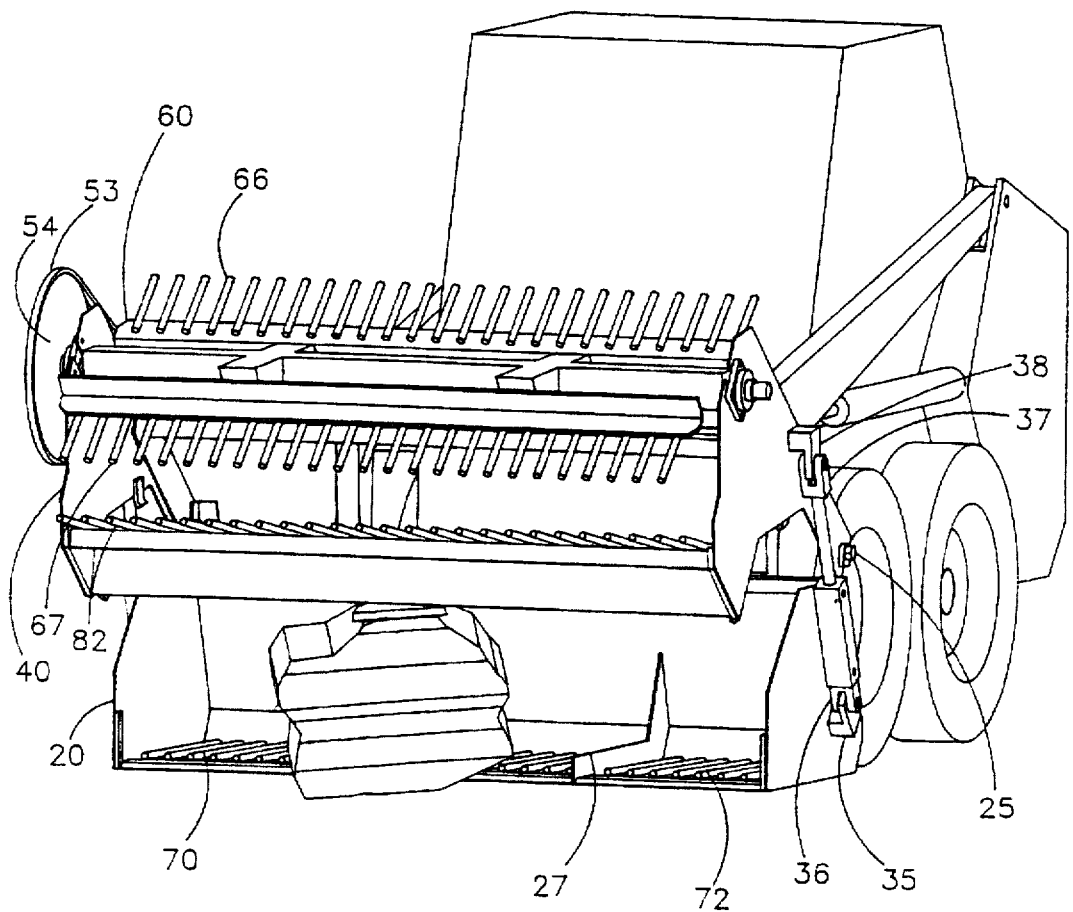
FIG. 4 is a left frontal view of the rock picker mounted on a loader in the lowered position. The carriage and bucket are shown separated from one another by extension of the side cylinders permitting the device to gather rocks directly into the bucket.
Figure 5:
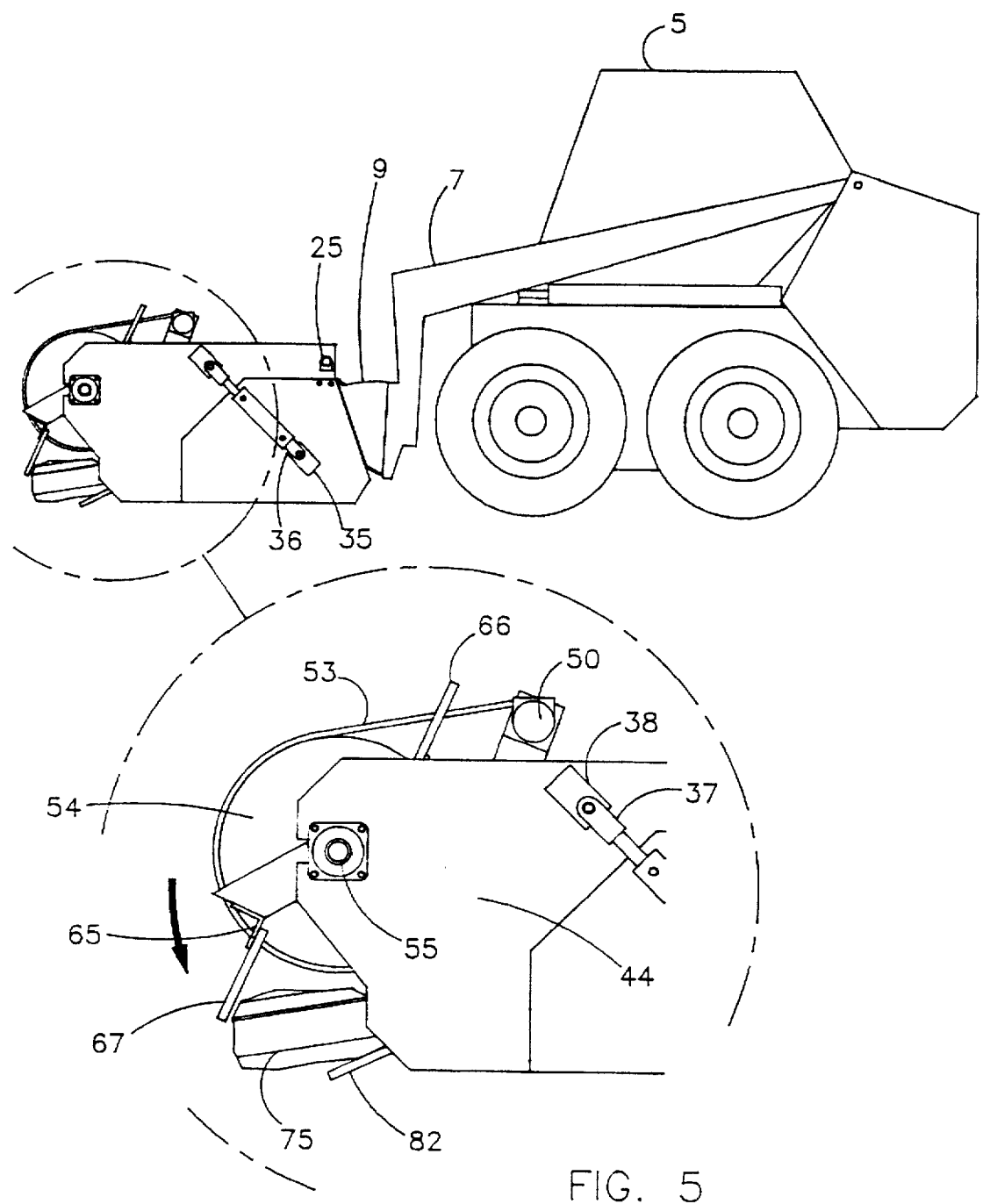
FIG. 5 is a side view of the rock picker attachment shown mounted on the bucket of a loader. The amplified view shows the hydraulic cylinder for separating the rock picker bucket from the carriage. This view also shows the point of attachment of the reel to the carriage and the hydraulic motor and chain sprocket assembly used to propel the reel in a sweeping motion.

The configuration of the grappling mode is illustrated in FIGS. 2–4. FIG. 2 shows the rock picking attachment in an exploded view. The apparatus includes a bucket 20 that is able to hold rocks. The bucket should be of sufficient size and durability to accommodate rocks up to 22 inches in diameter. The bucket is adaptable to mounting on the primary moving vehicle. The bucket can be attached directly to the arms of a loading vehicle or, as shown in FIG. 5, the bucket is mounted on another attachment such as another bucket on the primary moving vehicle.

The bucket 20 shown in FIG. 2 is defined by a back plate 23 a base plate 21 and bucket sidewalls 28 and 29. The sidewalls are spaced a substantially equal distance and parallel to one another between the back plate creating the inner area of the bucket. The bucket is constructed of hardened steel. The back plate 23 is angularly shaped in the preferred embodiment so that the depth of the base is greater than the depth at the top portion of the bucket as shown in FIG. 5. This permits the attachment to hold a maximum load without allowing contents to fall over the back while the bucket is in the raised position. The back plate 23 should also be angled slightly forward when the bucket is resting on the ground.

Figure 7:
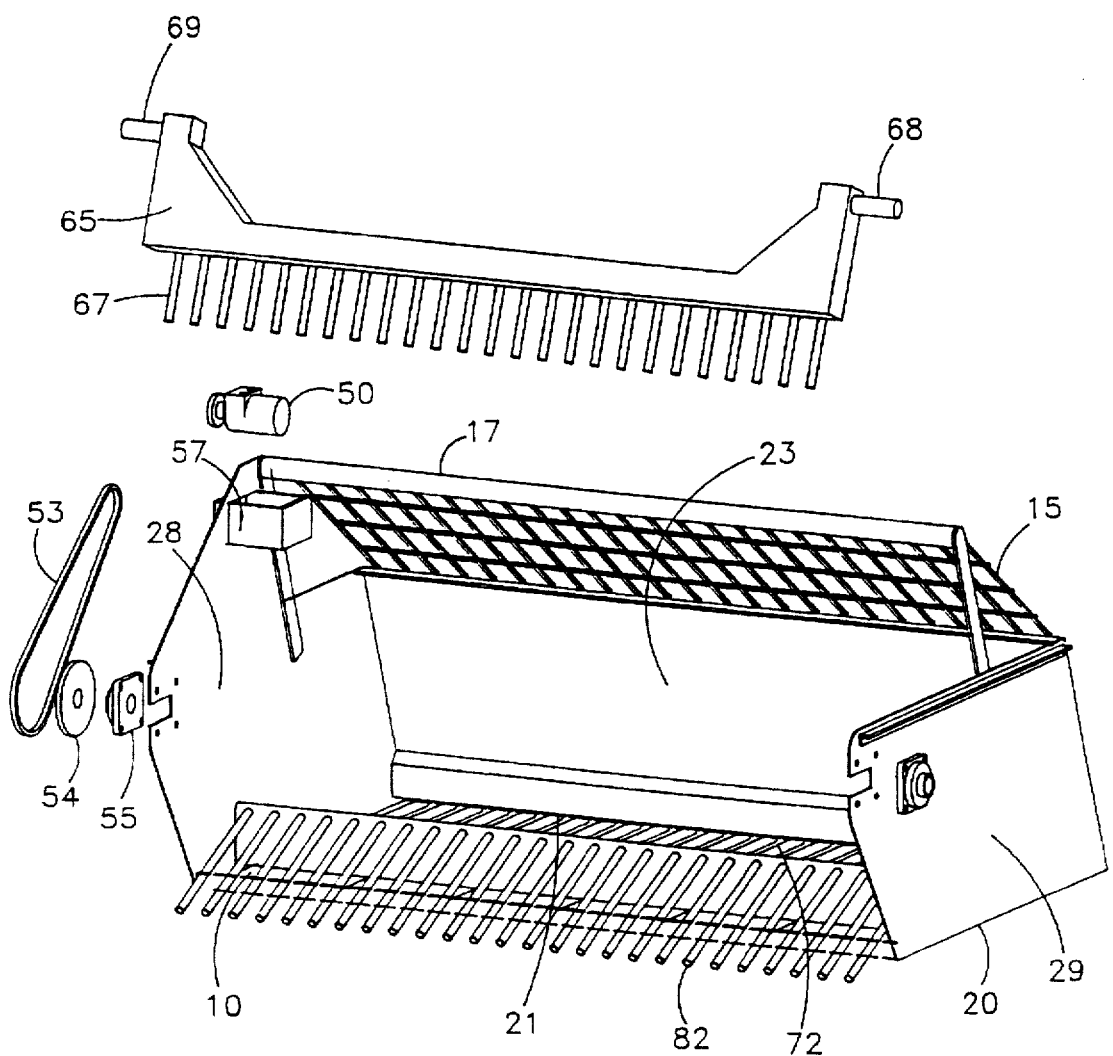
FIG. 7 is an exploded right frontal view of the rock picker showing the base bucket and pivoting reel. The hydraulic motor and roller chain drive is shown attached to the bucket.
Figure 8:
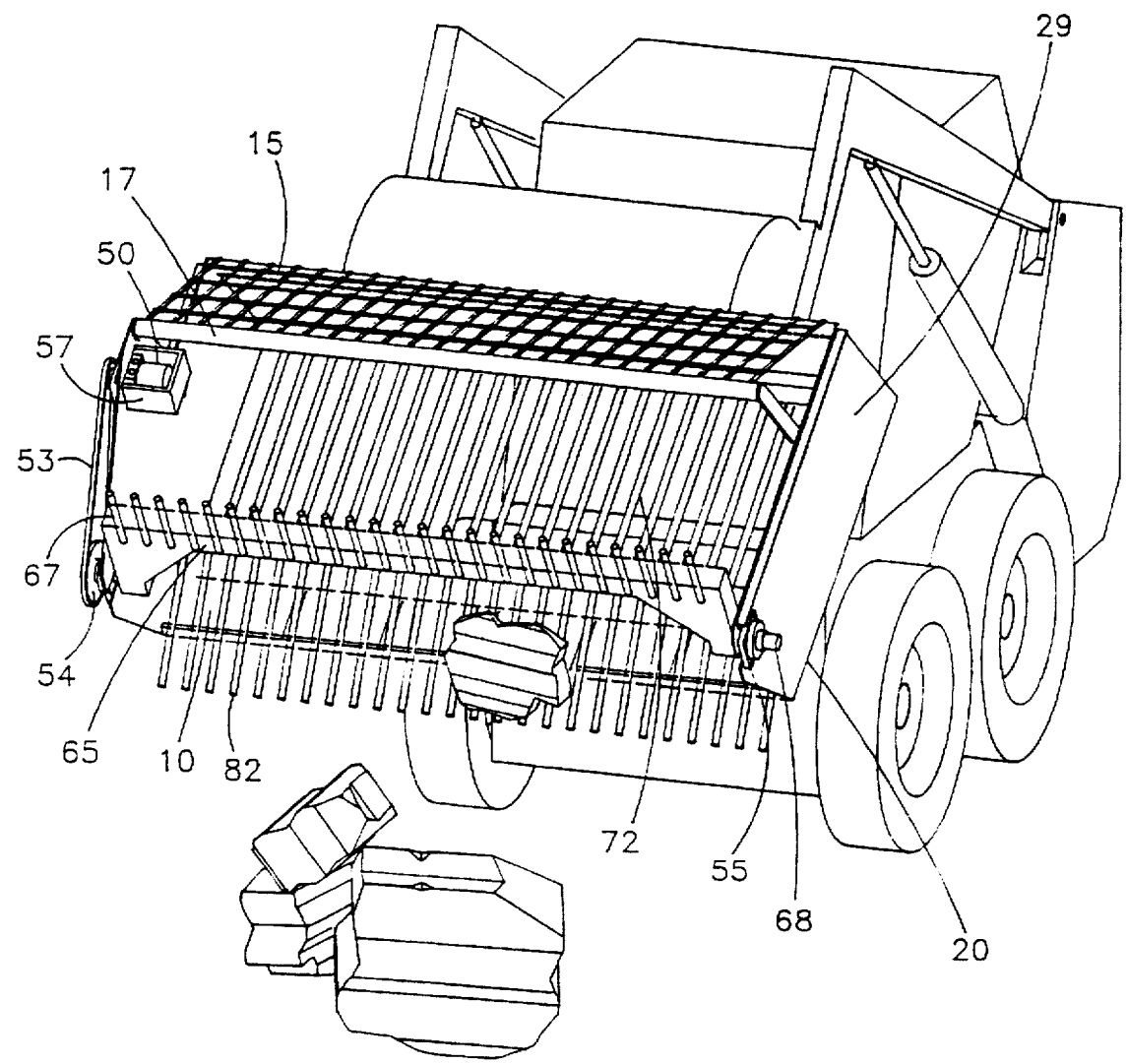
FIG. 8 is a left frontal view of the rock picker mounted on a loader in the raised position. The bucket is shown dumping rock contents from the bucket.
Figure 9:
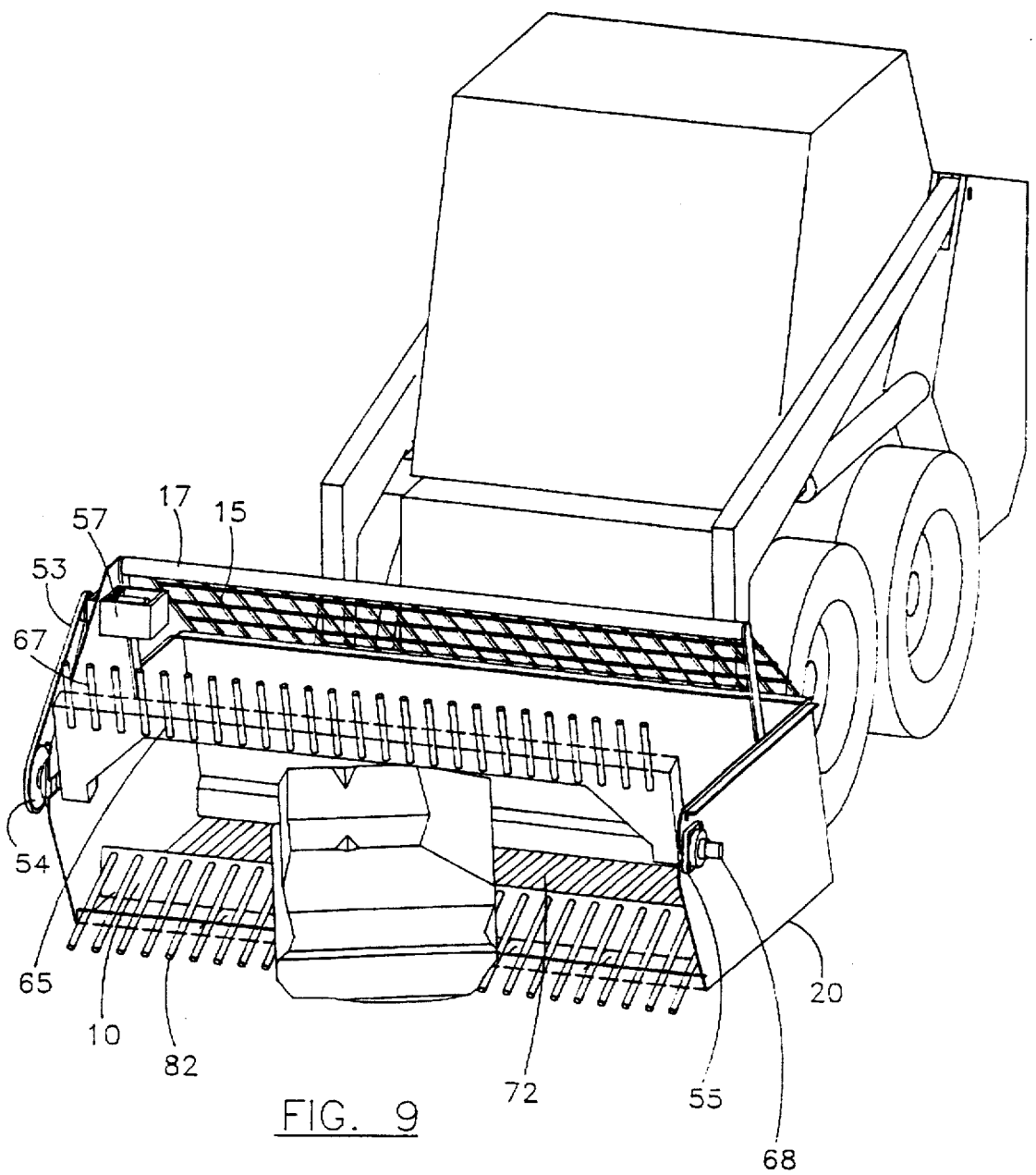
FIG. 9 is a left frontal view of the rock picker mounted on a loader in the lowered position. The bucket is shown gathering rocks.
Figure 10:
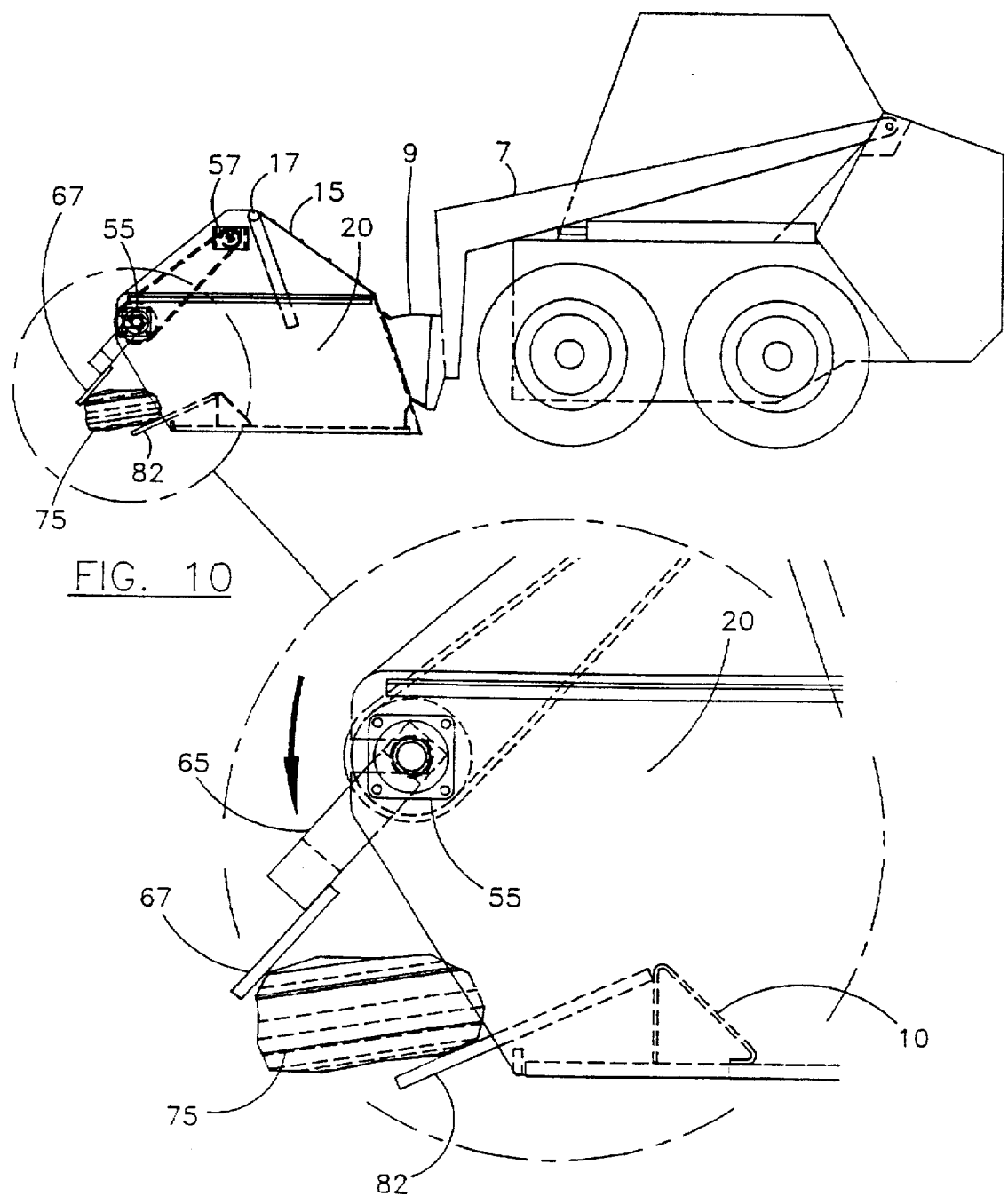
FIG. 10 is a side view of the rock picker attachment shown mounted on the bucket of a loader. The amplified view shows the reel sweeping a rock into the bucket.

FIG. 7 shows a larger bucket 20 in the most preferred embodiment. This larger design of the bucket permits the reel 40 to mount thereon. This is shown in FIGS. 8–9. This design also includes a protective operator shield 15. The protective shield feature can also be used on the grappling embodiment.

FIG. 2 shows the base plate 21 with an overlying grate 70 portion that is designed to protect and reinforce the bottom of the bucket from excessive wear and tear. The preferred embodiment includes a plurality of lower spaced elongated tubular steel bars 72 spaced substantially parallel to one another. In addition to protecting the base plate 21 of the bucket from harm when rocks and other material are gathered, the bars allow some limited separation of dirt and debris from rocks. The bars 72 can be welded to the base plate of the bucket.

The bucket also includes at least one base support and, preferably, two base supports 26 and 27. These supports reinforcably attach the base plate 21 to the back plate 23. The base supports increase the strength of the lower bucket structure by providing a point of attachment between the base and back plates. The supports reside within a groove cut to a given length and width in the two plates and are welded therein. This greatly increases the ability of the bucket to remain intact when bearing the weight of sizable loads of rock and other material over a period of time.

The most preferred embodiment is shown in FIG. 7 where the angular upper grate 80 is mounted at the front base portion of the bucket 20. The grate is similar to the grate mounted on the carriage 40. One difference is that the grate forks are mounted on a center support brace 10 that extends in an upward angular direction toward the rear of the bucket. The center support then curves downward forming a ridge at its apex. This ridge prevents rocks from rolling forward while the machine is moving. The center support attaches to the baseplate reinforcing the bucket.

FIG. 2 also shows a bracket 22 mounted horizontally across the top of the bucket being of adequate size and strength to pivotally attach the bucket to a carriage 40. The preferred means of securing the bracket to the bucket is welding a tubular bracket across the top portion of the back plate and joining the ends to each of the respective sidewalls 28 and 29 by rivet or by using hardware.

The bracket 22 is designed to pivotally join the bucket 20 to the carriage 40 so that the two are in an operative relationship. The bracket is turned up at each end and includes openings through which locking bolts 24 and 25 can pass through. The carriage 40 includes arm extension portions 43 and 45 that each include respective bucket mount openings 47 and 48. The locking bolts 24 and 25 adjustably extend through the bucket mount openings 47 and 48 permitting the carriage to pivotally mount on the bucket.

The carriage 40 itself includes reinforced sidewalls 42 and 44 spaced from one another by a backwall 49. The width of the sidewalls of both the bucket 20 and carriage are substantially equal so that the edges of the bucket and carriage sidewalls interface with one another. The carriage also includes a bottom base portion 41 and a top carriage bracket 46 attached respectively to the end of each sidewall.

The carriage sidewalls 42 and 44 each also include mounting pin openings 58 and 59 sized to hold a reel 60 that can pivotally rotate in a sweeping fashion. Two kinds of reel mounting designs can be used with the "Kwik Pik" each having distinct advantages. The first design includes a reel with a center shaft portion 62 that has mounting pins 68 and 69 extending from each end of the shaft. The center shaft forms a horizontal axis about which the reel is able to turn. This design permits the use of reinforcing crossbars to strengthen the reel as described below.

The second design replaces the center shaft portion with right and left angle leg members 92 and 94. These leg members also have mounting pins 68 and 69 projecting from the side of each member. The benefit of this embodiment is that visibility for the operator is increased by eliminating the center shaft so that person can better see into the bucket area and more quickly react to rocks jamming or other problems that may develop.

Figure 1:
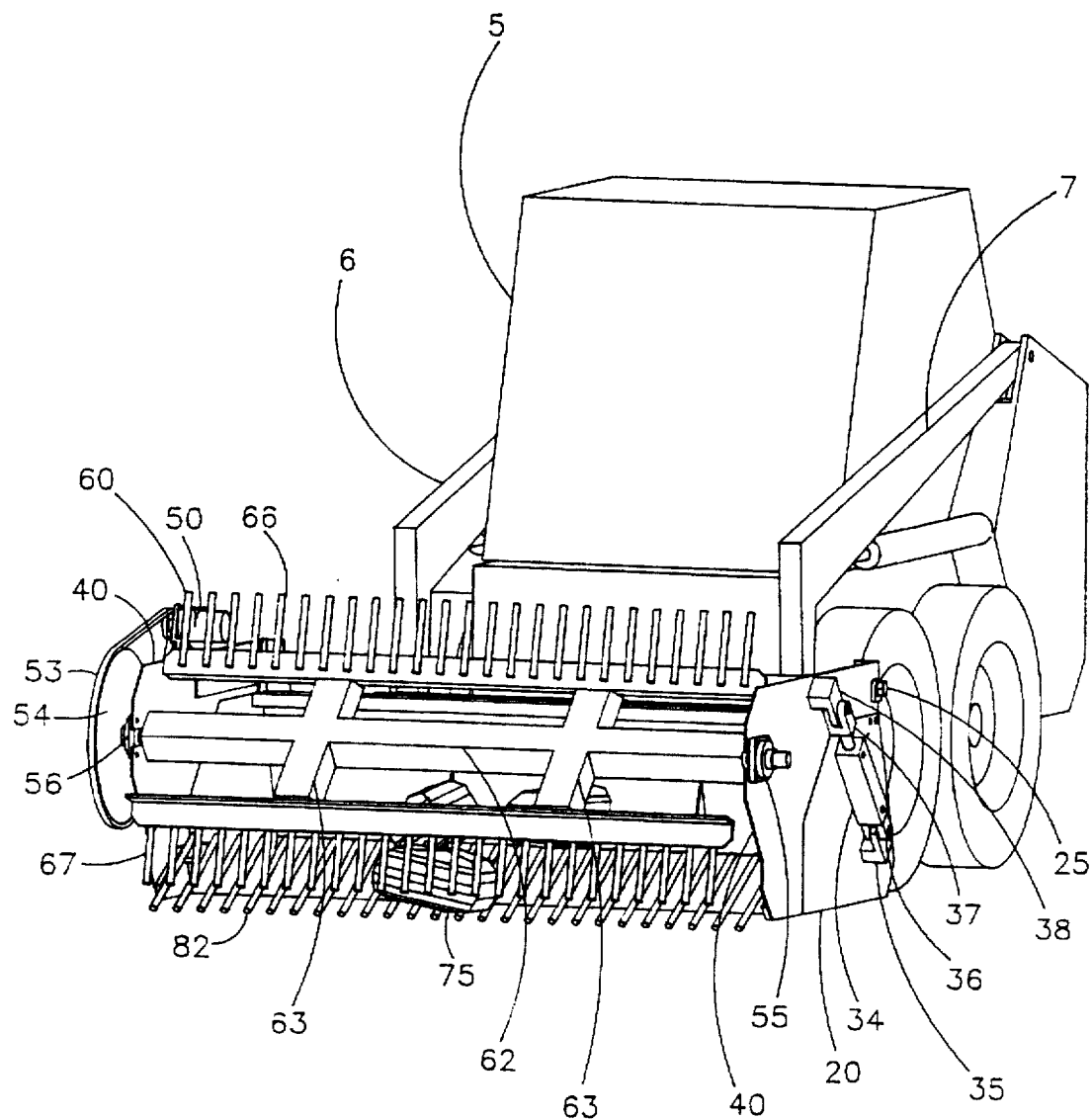
FIG. 1 is a frontal left view of the "Kwik Pik" rock picking attachment shown mounted on a loader serving as the primary moving vehicle.

The mounting pins have a diameter slightly less than the diameter of the respective mounting pin openings so that the reel 60 can freely rotate about the axis formed when the pins are extended through the openings. The shaft 62 or leg members 92 and 94 are fixedly held in a horizontal position by opposing pin clamp assemblies 55 and 56 on each sidewall as is shown in FIGS. 1 and 5. The pin clamp assemblies each include a bracket with an opening, each bracket being bolted to one of the sidewalls. Each bracket has an opening large enough to receive the mounting pins on each end of the shaft so that the mounting pins are held in place.

The reel also includes at least one crossbar 63 in the first design having a first end attached to and intersecting the shaft 62 at a substantially perpendicular angle. The second end of each crossbar attaches to a tooth bracket 64 or 65. Each tooth bracket 64 and 65 includes a plurality of teeth 66 and 67. The crossbar can be used in the second design only if more than one tooth bracket is used and the crossbars must be joined at each end directly to each tooth bracket.

The preferred embodiment of the first design includes a plurality of crossbars, preferably two, attached to the same tooth bracket on the second end, each crossbar being spaced from and substantially parallel to one another. The most preferred embodiment includes opposing upper and lower crossbars extending from the shaft at 180 degree intervals. The upper crossbars are attached to an upper tooth bracket 64 at the second end and the lower crossbars are attached to a lower tooth bracket 65 at the second end.

Figure 6:
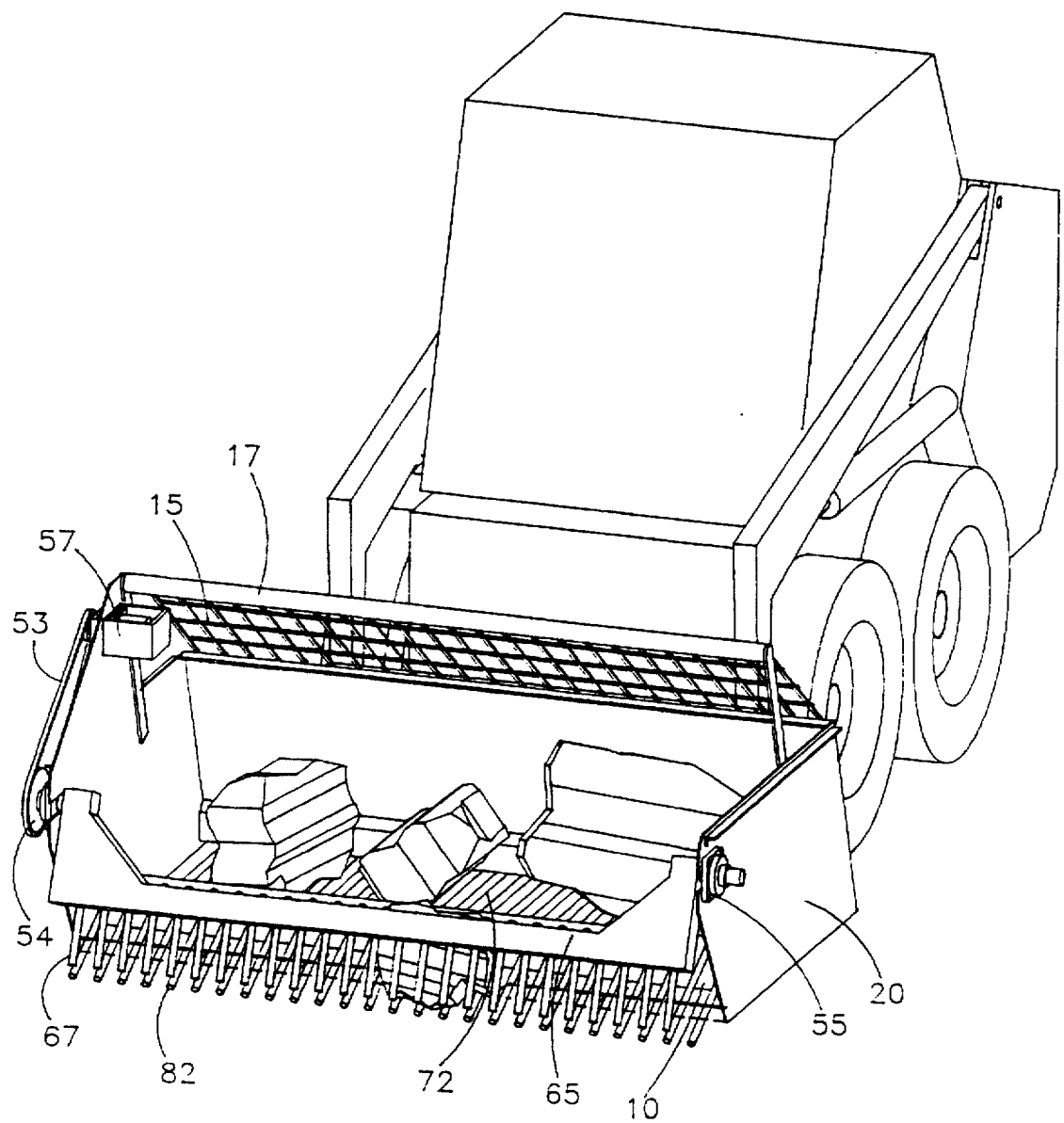
FIG. 6 is a frontal left view of the "Kwik Pik" rock picking attachment without the carriage shown mounted on a loader serving as the primary moving vehicle.

FIG. 6 shows one embodiment of the second design of the invention that includes a single bar reel. The single bar reel 90 configuration is mounted on right and left angle leg members 92 and 94. The upper end of the right and left angle leg members are pivotally mounted by the mounting pins 68 and 69. A tooth bracket 64 having a plurality of teeth 93 is attached to the respective ends of the mounting legs opposing the end proximal to the mounting pins. The single bar would be lighter and would increase the field of visibility due to the absence of the second bar. The speed of rotation of this embodiment should be approximately 35 rotations per minute.

The teeth 66 and 67 extend outwardly from the tooth brackets 64 and 65. The sweeping action of the reel is most efficient in gathering rocks if the teeth extend at an upward angle α along a horizontal plane from the bracket, as shown in FIG. 5. The teeth extend at an angle α of approximately 50 to 55 degrees in the most preferred embodiment.

The "Kwik Pik" used in the single bar reel configuration can discharge the contents by placing the single bar real 90 180° from the grate forks 82 engaging position. This position removes the tooth bracket 65 and the teeth 67 to allow material to be discharged by tipping the "Kwik Pik" Rock Picker forward and dumping the material on the ground. This is shown in FIG. 9 in the embodiment utilizing only the bucket. The reel mounts to the bucket 20 in the most preferred embodiment. The mounting assembly is essentially the same whether the reel mounts to the carriage 40 or the bucket 20.

The carriage 40 includes an angular upper grate portion 80 that can be lowered to touch the ground surface. The grate here is comprised of a number of elongated steel grate forks 82 functioning as forks spaced from and substantially parallel to one another. The bars are spaced from one another a distance sufficient to separate rocks over a given size from other material of smaller size when the attachment is moved forward. The bars are angularly mounted on at least one carriage base bracket 84. The teeth 66 and 67 are offset from the upper grate forks so that teeth can pass between the forks when the reel is rotated. Grate bracket angled back plate 81 is mounted to the bucket 20 end of the grate forks 82 communicating with the bucket base plate 21.

The invention also includes a motive means for rotating the reel in a sweeping manner about the carriage to gather rocks and debris. The preferred motive means includes a hydraulic motor 50 secured on a motor mount bracket 51 attached to the top carriage bracket 46 on one of the carriage sidewalls 42. The motor 50 drives a rear sprocket wheel 52 that is in an operative relationship with a front sprocket wheel 54 being driven by a chain 53. The front sprocket wheel 54 includes means for engaging one of the mounting pins 69. In the preferred embodiment the sprocket wheel 54 engages the mounting pin clamp assembly 56. The chain is looped about the wheels 52 and 54 permitting the motor to drive the reel.

FIG. 7 shows the drive mechanism mounted on the bucket 20 in the most preferred embodiment. The design of the chain drive assembly is the same whether it is mounted on the carriage or the bucket. The bucket must be slightly larger on the most preferred embodiment to accommodate the reel mounting.

The position of the bucket relative to the carriage can be adjusted by a hydraulic means. The position of the bucket can be expanded to a first open position to expel bucket contents or it can be contracted to a second closed position to contain bucket contents. This may be done remotely by an operator. The hydraulic means is not necessary in the most preferred embodiment where the grappling action is not utilized.

The hydraulic means includes a hydraulic cylinder 30 and 34 on each side of device. In the preferred embodiment each cylinder is fixedly attached on its lower end to the outside of each bucket sidewall 28 and 29 by bucket mounting brackets 31 and 35. The upper end of each cylinder is fixedly attached to the outside of each carriage sidewall 42 and 44 by carriage mounting brackets 38 and 39.

Each cylinder 30 and 34 is engaged with each lower bucket mounting bracket 31 and 35 and upper carriage mounting bracket 38 and 39 by an upper turnbuckle 33 and 37 and lower turnbuckle 32 and 36 assembly on each end. The hydraulic cylinder can be controlled by a remote operator. Expanding the cylinder permits the bucket to separate from the carriage when moved to the first position. Contracting the cylinder brings the bucket and carriage to a second closed position thus holding the two adjacent to one another facilitating the containment of rocks.

I claim:

1. A rock picking apparatus that removably attaches to a front end of a primary moving vehicle, comprising:

a forward dumping bucket including a back plate adapted for attachment to the front end of the vehicle, a base plate spaced from the back plate, a pair of side plates connected to the back plate and the base plate, and a plurality of spaced, parallel, elongated steel bars extending in a substantially horizontal plane between the base plate and the back plate;

the back plate, the base plate, the pair of side plates, and the steel bars defining a bucket storage area which is closed at a rear end thereof by the back plate and which is open at a front end thereof;

a plurality of angled grate forks attached to a center support member mounted on the base plate, said grate forks being angled so as to extend in a direction generally toward the back plate of the bucket, and said center support member being configured so as to form a raised ridge upon the base plate;

a rotating reel rotationally supported by, and extending between, the pair of side plates, the rotating reel including a tooth mounting bracket having a plurality of teeth attached thereto and projecting outwardly therefrom; and drive means connected to the reel for rotating the reel.

2. A rock picking apparatus according to claim 1, wherein said rotating reel further includes angle leg members disposed at opposite ends of the tooth mounting bracket.

3. A rock picking apparatus according to claim 2, further including a mounting pin extending from each angle leg member, each said side plate including a mounting pin opening which receives a respective one of said mounting pins, said mounting pins being secured by a mounting pin clamp bolted to each said side plate.

4. A rock picking apparatus according to claim 2, wherein said drive means comprises a hydraulic motor connected to a rear sprocket wheel, a front sprocket wheel fixedly attached to one of said mounting pins, and a chain looped around the rear sprocket wheel and the front sprocket wheel.

5. A rock picking apparatus according to claim 1, wherein said teeth are offset from said grate forks so that the teeth pass between the grate forks when the reel is rotated.

6. A rock picking apparatus according to claim 1, further comprising a protective operating shield attached to the bucket for protecting an operator of the primary moving vehicle.

7. A rock picking apparatus that removably attaches to a front end of a primary moving vehicle, comprising:

a forward dumping bucket including a back plate adapted for attachment to the front end of the vehicle, a base plate spaced from the back plate, a pair of side plates connected to the back plate and the base plate, and a plurality of spaced, parallel, elongated steel bars extending in a substantially horizontal plane between the base plate and the back plate;

the back plate, the base plate, the pair of side plates, and the steel bars defining a bucket storage area which is closed at a rear end thereof by the back plate and which is open at a front end thereof;

a carriage pivotally attached to an upper bracket which is mounted at an upper end of the bucket such that said carriage is able to pivot between open and closed positions relative to the bucket, the carriage including a pair of side walls spaced from each other by a back wall and a base bracket extending between the side walls;

a plurality of angled grate forks attached to the base bracket and extending in a direction generally toward the back plate of the bucket when the carriage is in the closed position;

a rotating reel rotationally supported by, and extending between, the pair of side walls, the rotating reel including at least one tooth mounting bracket having a plurality of teeth attached thereto and projecting outwardly therefrom;

hydraulic means connected to the bucket and the carriage for actuating the carriage between the open and the closed positions; and drive means connected to the reel for rotating the reel.

8. A rock picking apparatus according to claim 7, wherein said reel includes a center shaft portion and at least one cross bar integrally connected to the center shaft portion and supporting the at least one tooth mounting bracket.

9. A rock picking apparatus according to claim 8, further including a mounting pin extending from each end of said center shaft portion, each said side wall of the carriage including a mounting pin opening which receives a respective one of said mounting pins, said mounting pins being secured by a mounting pin clamp bolted to each said side wall.

10. A rock picking apparatus according to claim 9, wherein said drive means comprises a hydraulic motor attached to a rear sprocket wheel, a front sprocket wheel fixedly attached to one of said mounting pins, and a chain looped around the rear sprocket wheel and the front sprocket wheel.

11. A rock picking apparatus according to claim 7, wherein the rotating reel includes an additional tooth mounting bracket having a plurality of teeth attached thereto and projecting outwardly therefrom.

12. A rock picking apparatus according to claim 7, wherein said teeth are offset from said grate forks so that the teeth pass between the grate forks when the reel is rotated.

13. A rock picking apparatus according to claim 7, further comprising at least one base support attached to, and extending between, said base plate and said back plate for strengthening the bucket.

14. A rock picking apparatus according to claim 7, wherein the upper bracket includes a pair of up-turned ends and said carriage includes a pair of carriage arms adjacent said up-turned ends, and locking bolts pivotally connecting the up-turned ends and the carriage arms thus permitting pivoting of the carriage relative to the bucket.

15. A rock picking apparatus according to claim 7, wherein said hydraulic means comprises a hydraulic cylinder having a turnbuckle assembly at a first end thereof connected to a mounting bracket on one of said side plates and having a turnbuckle assembly at a second end thereof connected to a mounting bracket on one of said side walls.

16. A rock picking apparatus according to claim 7, further comprising a plurality of support braces extending between the side walls and the back wall.

17. A rock picking apparatus that removably attaches to a front end of a primary moving vehicle, comprising:

a forward dumping bucket including a back plate adapted for attachment to the front end of the vehicle, a base plate spaced from the back plate, a pair of side plates connected to the back plate and the base plate, and a plurality of spaced, parallel, elongated steel bars extending in a substantially horizontal plane between the base plate and the back plate;

the back plate, the base plate, the pair of side plates, and the steel bars defining a bucket storage area which is closed at a rear end thereof by the back plate and which is open at a front end thereof;

a plurality of angled grate forks attached to a center support member mounted on the base plate, said grate forks being angled so as to extend in a direction generally toward the back plate of the bucket, and said center support member being configured so as to form a raised ridge upon the base plate;

a rotating reel rotationally supported by, and extending between, the pair of side plates, the rotating reel including a tooth mounting bracket having a plurality of teeth attached thereto and projecting outwardly therefrom and angle leg members disposed at opposite ends of the tooth mounting bracket, said teeth being offset from said grate forks so that the teeth pass between the grate forks when the reel rotates, and a mounting pin extending from each angle leg member, each said side plate including a mounting pin opening which receives a respective one of said mounting pins, said mounting pins being secured by a mounting pin clamp bolted to each said side plate;

reversible drive means connected to the reel for rotating the reel, said drive means comprising a reversible hydraulic motor attached to a rear sprocket wheel, a front sprocket wheel fixedly attached to one of said mounting pins, and a chain looped around the rear sprocket wheel and the front sprocket wheel; and a protective operating shield attached to the bucket for protecting an operator of the primary moving vehicle.

18. A rock picking apparatus that removably attaches to a front end of a primary moving vehicle, comprising:

a forward dumping bucket including a back plate adapted for attachment to the front end of the vehicle, a base plate spaced from the back plate, a pair of side plates connected to the back plate and the base plate, and a plurality of spaced, parallel, elongated steel bars extending in a substantially horizontal plane between the base plate and the back plate;

the back plate, the base plate, the pair of side plates, and the steel bars defining a bucket storage area which is closed at a rear end thereof by the back plate and which is open at a front end thereof;

a carriage pivotally attached to a bracket which is mounted at an upper end of the bucket for pivoting movements between open and closed positions relative to the bucket, the carriage including a pair of side walls spaced from each other by a back wall and a base bracket extending between the side walls;

a plurality of angled grate forks attached to the base bracket and extending in a direction generally toward the back plate of the bucket when the carriage is in the closed position;

a rotating reel rotationally supported by, and extending between, the pair of side walls, the rotating reel including a center shaft portion, at least one cross bar integrally connected to the center shaft portion and supporting at least one tooth mounting bracket, said at least one tooth mounting bracket having a plurality of teeth attached thereto and projecting outwardly therefrom, said teeth being offset from said grate forks so that the teeth pass between the grate forks when the reel is rotated;

a mounting pin extending from each end of said center shaft portion, each said side wall of the carriage including a mounting pin opening which receives a respective one of said mounting pins, said mounting pins being secured by a mounting pin clamp bolted to each said side wall;

lifting means connected to the bucket and the carriage for actuating the carriage between the open and the closed positions, said lifting means comprising a turnbuckle assembly at a first end thereof connected to a mounting bracket on one of said side plates and having a turnbuckle assembly at a second end thereof connected to a mounting bracket on one of said side walls; and reversible drive means connected to the reel for rotating the reel, said reversible drive means attached to a rear sprocket wheel, a front sprocket wheel fixedly attached to one of said mounting pins, and a chain looped around the rear sprocket wheel and the front sprocket wheel.

* * * * *